Sept. 13, 1932.  A. J. NOUSI  1,877,025
PAN FASTENER FOR CONVEYER MACHINERY
Filed July 13, 1931   2 Sheets-Sheet 1

Inventor
A. J. Nousi.
By Lacey & Lacey,
Attorneys

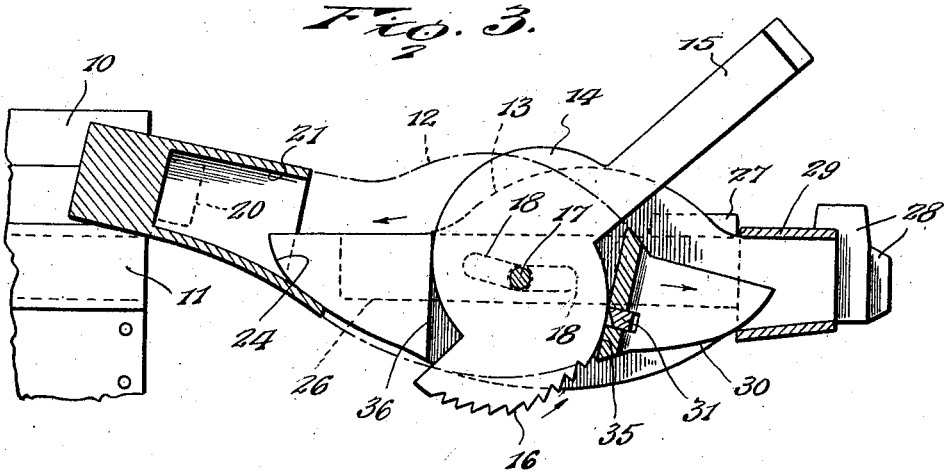
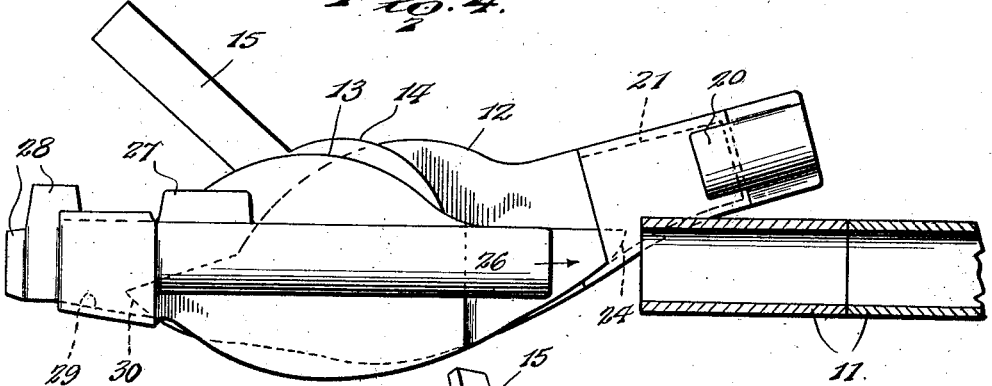
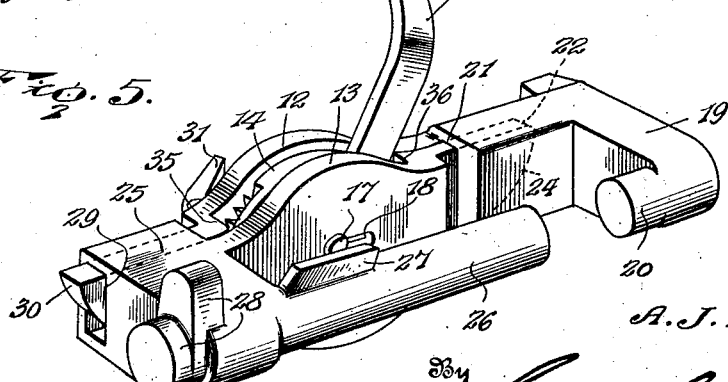

Patented Sept. 13, 1932

1,877,025

UNITED STATES PATENT OFFICE

ADAM J. NOUSI, OF SUPERIOR, WYOMING

PAN FASTENER FOR CONVEYER MACHINERY

Application filed July 13, 1931. Serial No. 550,520.

This invention relates to pan fasteners for conveyer machinery and has for its principal object to provide a strong, durable pan fastener which will be quick acting both in application to and removal from the eyes of adjoining pans of a conveyer.

In the coal mining industry where conveyer machines are used, including a string of pans to transport the coal from place to the cars in the main entry, ordinary bolts have hitherto been used for coupling together the eyes of adjoining pans. These bolts frequently get out of order as the threads wear out and break, and it takes considerable time to apply and remove the bolts. It is, therefore, a further object of the present invention to provide a pan fastener devoid of screw threads and including essentially a pair of sliding and pivoted plates, one carrying a main bolt and the other carrying a lug to couple the eyes of contiguous pans, and operated by simply rocking a single lever which carries a cam that operates on jaws of the plates to move the bolt and lug toward each other.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

Figure 1:
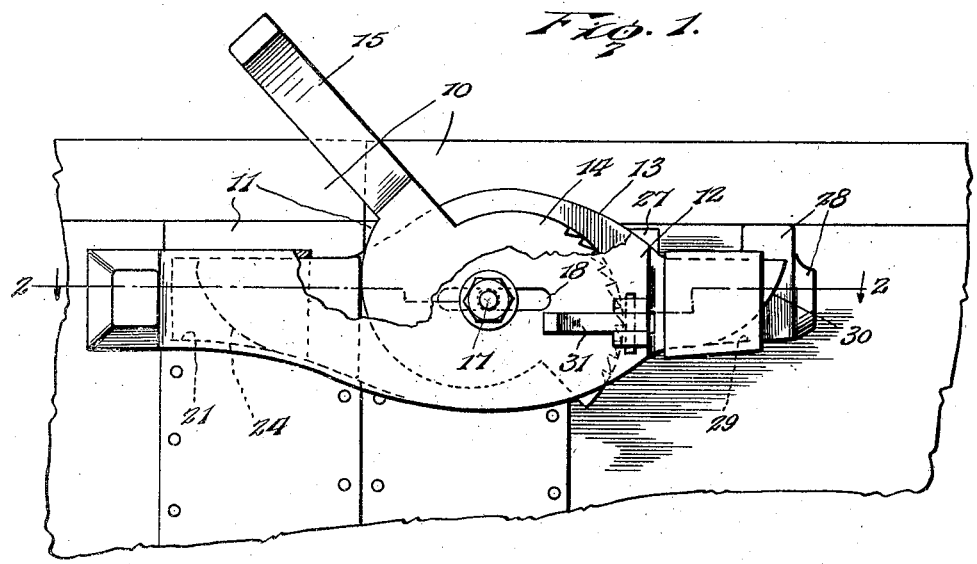
Figure 2:
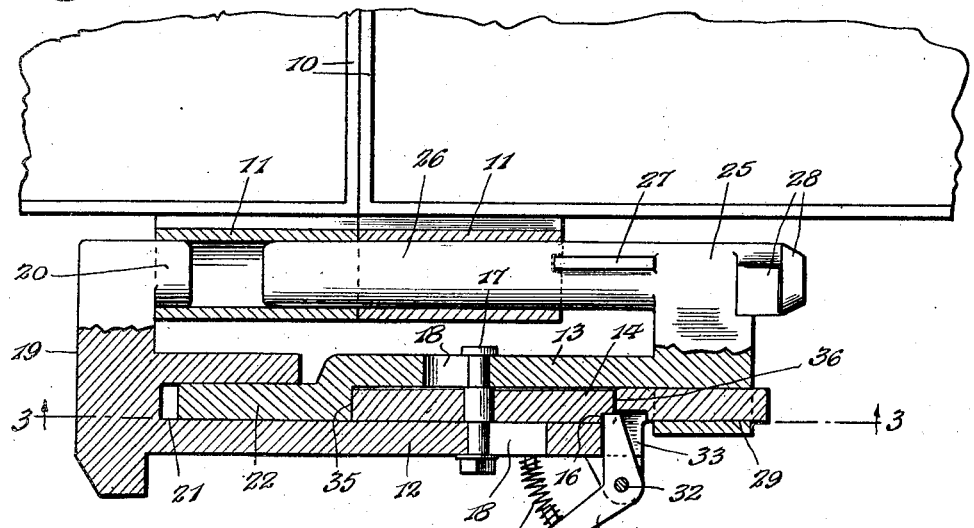

In the accompanying drawings forming part of this specification,

Figure 1 is a side elevation of the device in operative position for coupling together two adjoining pans, Fig. 2 is a longitudinal sectional view taken on the line 2—2 of Fig. 1, Fig. 3 is a longitudinal sectional view taken on the line 3—3 of Fig. 2 but showing the parts open preparatory to being applied, Fig. 4 is a rear elevation of the device in the position shown in Fig. 3, and Fig. 5 is a perspective view of the device.

Referring now to the drawings in which like characters of reference designate similar parts in the various views, 10 designates adjoining pans of a conveyer, and 11 designates contiguous eyes of the pans.

For coupling the eyes 11 together, I provide a device, best shown in Fig. 5, comprising a pair of plates 12 and 13 recessed on their inner faces to receive between them a cam disk 14, best shown in Fig. 3. The two semicircular halves of the cam disk are eccentrically disposed with respect to each other. One of the halves is provided with an integral operating lever 15, and the other is provided with ratchet teeth 16. A pivot pin 17 connects the plates and the cam, and both of the plates are provided with longitudinal slots 18 which slidably receive the pivot pin, so that when the lever 15 is rocked the plates have pivotal as well as sliding movement on the pivot pin when the cam is rotated, as will be presently described in detail.

The plate 12 is provided with a transverse head 19 which terminates in a lug 20. The plate 12 adjacent the head is recessed to provide a socket 21, best shown in Fig. 2, to receive the free end 22 of the plate 13, which free end is rounded, as shown at 24 in Fig. 3, to easily enter the socket 21.

Likewise, the plate 13 is provided with a transverse head 25, best shown in Fig. 5, which terminates in a main bolt 26 of considerably greater length than the lug 20 and disposed in alinement therewith. Adjacent the head the bolt is provided with an upstanding lug 27 which is adapted to engage in a slot in the eye of one of the pans and prevent rotation of the device. The head 25 is provided with right angularly disposed lugs, designated in general by the numeral 28, Fig. 5, which may be struck by a hammer or ax to get the bolt out of the pan eyes when necessary. The head 25 is hollowed out to provide a socket 29 to receive the free end of the plate 12, which free end is rounded at the bottom, as shown at 30, to facilitate easy entry into the socket.

An angular dog 31 is pivoted, as shown at 32 in Fig. 2, on the plate 12 and projects through a recess 33 in said plate to engage the ratchet teeth 16 of the cam 14. A helical spring 34 is interposed between the free leg of the dog and the plate 12 to hold the dog normally engaged with the ratchet teeth.

By referring now to Figs. 2 and 3, it will be seen that the offset portions of the plates 12 and 13, which receive between them the cam 14, provide respective jaws 35 and 36, against which the opposite cam surfaces of the cam bear. When the minor diameter of the cam engages both jaws, as shown in Fig. 3, it will be apparent that, by swinging the lever 15 in the direction of the arrow-head, the jaws 35 and 36 will be spread apart by the cam. Spreading apart of the jaws moves the plates longitudinally and carries the free end of each plate into the socket of the other plate. Since the main bolt 26 and lug 20 are carried respectively by the socketed ends of the plates, it will be apparent that the main bolt and lug have consequently been moved toward each other to the position shown in Fig. 2. The extreme length of the bolt permits the bolt entering two contiguous eyes 11 while the lug 20 enters one of the eyes only.

Preparatory to applying the device, the dog is released and the lever 15 is rocked to one limit of its movement, as shown best in Fig. 3, to bring the minor diameter of the cam 14 between the jaws 35 and 36. The plates may now be manually pulled apart to withdraw the free end of each plate from the socket in the opposite plate and move the main bolt 26 and lug 20 apart from each other to wide open position. During such movement of the plates, both plates must be rocked on the pivot pin 17 to dispose the main bolt and the lug out of alinement, as best shown in Fig. 4. The purpose of this is to permit the lug being raised above the eyes 11 to ride along above the eyes as the device is moved bodily manually in the direction of the arrow-head. When the bolt 26 has entered the eyes in position to couple the eyes, the lug 20 is manually depressed to aline with the bolt and then the lever 15 is rocked to its opposite limit of movement to bring the major diameter of the cam 14 against the jaws 35 and 36, during which movement of the cam the free end of each plate is thrust into the socket of the opposite plate, with consequent movement of the main bolt 26 and the lug toward each other so that both the bolt and the lug are inserted in the eyes, as best shown in Fig. 2. The dog 31 automatically locks the cam at this operative limit of movement.

From the above description, it will be observed that, by operating a single lever, the device may be applied to or removed from the eyes of contiguous pans so that a quick coupling or uncoupling of the pans is promoted. Furthermore, it will be observed that there are no threaded bolts entering the eyes and that the main bolt and lug which do enter the eyes are without threads and slide toward and away from each other, thus resulting in minimum wear to both these moving parts, as well as to the eyes.

Having thus described the invention, I claim:

1. A pan fastener for conveyers comprising spaced plates pivotally and slidably connected together and having opposite jaws, each plate having a socket at one end receiving the free end of the other plate, a bolt carried by the socket end of one plate, a lug carried by the socket end of the other plate, and a cam disposed between the plates and engaging the jaws of the plates for moving the plates longitudinally with consequent movement of the bolt and lug toward each other for entry into the contiguous eyes of adjoining conveyer pans.

2. A device for coupling together contiguous eyes of adjoining conveyer pans comprising a pair of plates pivotally and slidably connected together and having jaws disposed on opposite sides of the pivot, a cam disposed between the plates having semi-circular eccentrically disposed cam surfaces adapted to engage said jaws, a socket on each plate for engaging the free end of the other plate, a lug on the socket end of one plate, and a bolt on the socket end of the other plate, movement of the cam to bring the major diameter thereof against said jaws moving said plates longitudinally with consequent movement of the bolt and lug toward each other to enter said eyes and couple the pans together.

3. A device for coupling together contiguous eyes of adjoining pans of a conveyer comprising a pair of longitudinally slotted plates each having a socket at one end receiving the free end of the opposite plate, said plates being offset from each other to provide jaws on their inner faces disposed on opposite sides of said slots, a cam disposed in the offset portions of the plates, a pivot pin passed through said cam and through said slots for pivotally and slidably mounting the jaws and the cam relatively to each other, a lug carried by the socket end of one plate, and a bolt carried by the socket end of the other plate, pivotal movement of the plates permitting of the lug being disposed out of alinement with the bolt to permit the bolt being thrust into said eyes, reverse pivotal movement then permitting said lug to be brought into alinement with said bolt whereby movement of the cam against the jaws serves to slide said plates longitudinally and thrust said bolt and said lug into said eyes.

4. A device for coupling together contiguous eyes of adjoining pans of a conveyer comprising relatively movable plates, a cam for moving the plates in one direction longitudinally, a bolt carried by one plate, a lug carried by the other plate, and a socket carried by each plate receiving the free end of the other plate.

5. A pan fastener for conveyers comprising a pair of plates pivotally and slidably connected together and each having a socket at one end receiving the free end of the other plate, a cam between the plate having semicircular eccentrically disposed cam surfaces, jaws on the plates for engagement with said surfaces, a lug carried by the socket end of one plate, and a bolt carried by the socket end of the other plate, rotation of the cam to bring the minor diameter thereof between said jaws permitting of said plates being manually spread apart to move said bolt and said lug outwardly from each other, movement of said cam to bring the major diameter against said jaws moving said plates longitudinally and moving said bolt and said lug toward each other to engage in said eyes.

6. A pan fastener for conveyer pans comprising spaced plates slidably and pivotally connected together, a socket carried by each plate receiving the free end of the opposite plate, a cam disposed between the plates and operatively connected to the plates to move the plates longitudinally toward each other, a bolt carried by one of the plates, a lug carried by the other plate, and a pivoted spring pressed dog carried by one of the plates and operatively connected to the cam for locking the cam stationary at one limit of its movement.

In testimony whereof I affix my signature.

ADAM J. NOUSI.